United States Patent
Braun et al.

(10) Patent No.: US 12,040,735 B2
(45) Date of Patent: Jul. 16, 2024

(54) METHOD FOR ASCERTAINING, WITHOUT AN ENCODER, A ROTATIONAL ANGLE POSITION OF A ROTOR OF A BRUSHLESS DC MOTOR, AND HAND-HELD TOOL

(71) Applicant: Andreas Stihl AG & Co. KG, Waiblingen (DE)

(72) Inventors: Jan Lukas Braun, Waiblingen (DE); Simon Dietrich, Waiblingen (DE); Maximilian Robrecht, Fellbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 17 days.

(21) Appl. No.: 17/942,207

(22) Filed: Sep. 12, 2022

(65) Prior Publication Data
US 2023/0081532 A1    Mar. 16, 2023

(30) Foreign Application Priority Data
Sep. 13, 2021    (EP) .................................... 21196262

(51) Int. Cl.
*H02P 6/00*    (2016.01)
*H02K 7/14*    (2006.01)
*H02P 6/182*    (2016.01)

(52) U.S. Cl.
CPC ............. *H02P 6/182* (2013.01); *H02K 7/145* (2013.01)

(58) Field of Classification Search
CPC . H02P 6/182; H02P 6/183; H02P 6/16; H02K 7/145
See application file for complete search history.

(56) References Cited

U.S. PATENT DOCUMENTS

2018/0054148 A1    2/2018  Zhao

FOREIGN PATENT DOCUMENTS

| DE | 102010041021 A1 | * | 3/2012 | ................ H02P 6/17 |
| DE | 10 2019 211 975 A1 | | 2/2021 | |
| EP | 3 288 175 A1 | | 2/2018 | |
| WO | WO-2022176615 A1 | * | 8/2022 | |

OTHER PUBLICATIONS

German-language Search Report issued in European Application No. 21196262.6 dated Feb. 25, 2022 with partial English translation (nine (9) pages).
Briz, F. et al., "Rotor Position Estimation", IEEE Industrial Electronics Magazine, Jun. 2011, XP011366661, pp. 24-36 (13 pages).

* cited by examiner

*Primary Examiner* — Karen Masih
(74) *Attorney, Agent, or Firm* — Crowell & Moring LLP

(57) ABSTRACT

A method for ascertaining, without an encoder, a rotational angle position of the rotor of a brushless DC motor, includes the steps of: detecting a voltage induced in a stator of the brushless DC motor; checking whether the voltage induced in the stator is lower than a threshold value; and if the induced voltage is lower than the threshold value, then ascertaining an initial rotational angle position of the rotor based on an Indirect Flux detection by Online Reactance Measurement, and subsequently updating the rotational angle position proceeding from the calculated initial rotational angle position using at least one continuous test signal.

5 Claims, 1 Drawing Sheet

METHOD FOR ASCERTAINING, WITHOUT AN ENCODER, A ROTATIONAL ANGLE POSITION OF A ROTOR OF A BRUSHLESS DC MOTOR, AND HAND-HELD TOOL

CROSS REFERENCE TO RELATED APPLICATION

This application claims priority under 35 U.S.C. § 119 from European Patent Application No. 21 196 262.6, filed Sep. 13, 2021, the entire disclosure of which is herein expressly incorporated by reference.

BACKGROUND AND SUMMARY OF THE INVENTION

The invention relates to a method for ascertaining, without an encoder, a rotational angle position of a rotor of a brushless DC motor, and to a hand-held tool.

The invention is based on the object of providing a method for ascertaining, without an encoder, a rotational angle position of a rotor of a brushless DC motor and a hand-held tool that are able to determine the rotational angle position of the rotor reliably, with as little delay as possible and with a low level of noise.

The method according to the invention is used to ascertain, without an encoder, a rotational angle position of a rotor of a brushless DC motor, in particular proceeding from an unknown rotational angle position of the rotor and in particular proceeding from a rotational speed greater than zero.

The method includes the following step: in a first step of the method, a (counter-) voltage induced in a stator of the brushless DC motor is usually detected or measured.

It is then checked whether the detected or measured voltage is less than a threshold value that has been ascertained or calculated empirically for example.

If the induced voltage is less than the threshold value, a starting or an initial rotational angle position of the rotor is ascertained or calculated based on an Indirect Flux detection by Online Reactance Measurement (INFORM). In the INFORM method, at least two linearly independent voltage pulses are impressed, with the rotational angle position of the rotor or the rotor position being calculated from the current response. With respect to this method that is known per se, reference is otherwise also made to the relevant technical literature. The advantage of the INFORM method is the very rapid ascertainment of the starting or initial rotational angle position of the rotor or the absolute rotor position even after a few test pulses. However, since the test pulses used have to be linearly independent (two pulses offset from one another by 90° or three pulses offset from one another by 120° are typically used), a current response also always arises in the direction of the q axis. When taking into account a maximum motor current amplitude, the torque-forming current must be reduced by the current generated by the test signal.

After the initial rotational angle position has been calculated, the rotational angle position is updated continuously, where necessary until a threshold rotational speed is reached, proceeding from the calculated initial rotational angle position using one or more continuous test signals.

In one embodiment, the updating of the rotational angle position proceeding from the calculated initial rotational angle position using the at least one continuous test signal involves the following steps: feeding or impressing continuous test signals, in particular in the form of continuous test voltages, into the stator or stator windings of the brushless DC motor, ascertaining response signals, in particular in the form of response currents, that result depending on the continuous test signals, and determining the rotational angle position of the rotor depending on the test signals and the response signals. The continuous test signals may be, for example, three continuous square-wave or sinusoidal test voltages that are applied to associated phases of a three-phase brushless DC motor.

The test signal or signals may be fed in continuously in a manner synchronous with the rotor or in a manner not synchronous with the rotor. The test signal or signals may be fed in in the direction of the d axis, as a result of which the torque-forming Q current has to be reduced only minimally in order not to exceed a prescribed maximum current amplitude. The infeed of the test signals is significantly less noisy than the initial method based on INFORM. However, the determination of the initial rotational angle position of the rotor based on the continuous test signals would last a relatively long time, so the INFORM method is used according to the invention for this purpose. Furthermore, when using continuous test signals to distinguish between the positive and negative d axis, an additional test pulse with a high amplitude (saturation pulse) would initially have to be impressed in the direction of the d axis, which can be dispensed with due to the use of the INFORM method.

In one embodiment, if the induced voltage is equal to the threshold value or is greater than the threshold value, the following step is carried out: calculating the rotational angle position of the rotor depending on the (counter-) voltage induced in the stator or the stator windings or (counter-) voltages induced in the stator or the stator windings. With respect to the ascertainment, known per se, of the rotational angle position of the rotor based on the counter-voltage(s) in the stator, reference is made to the relevant technical literature.

In one embodiment, the calculation of the rotational angle position of the rotor based on the Indirect Flux detection by Online Reactance Measurement (INFORM) and the updating of the rotational angle position proceeding from the calculated initial rotational angle position using the at least one test signal are carried out up to a threshold rotational speed, wherein the threshold rotational speed is in a range between 18% and 22% of the rated rotational speed or maximum rotational speed of the brushless DC motor.

The hand-held tool has a brushless DC motor and a motor control apparatus for driving the brushless DC motor, for example in the form of a microprocessor controller, wherein the motor control apparatus is designed to control the hand-held tool in such a way that a method as described above is carried out.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
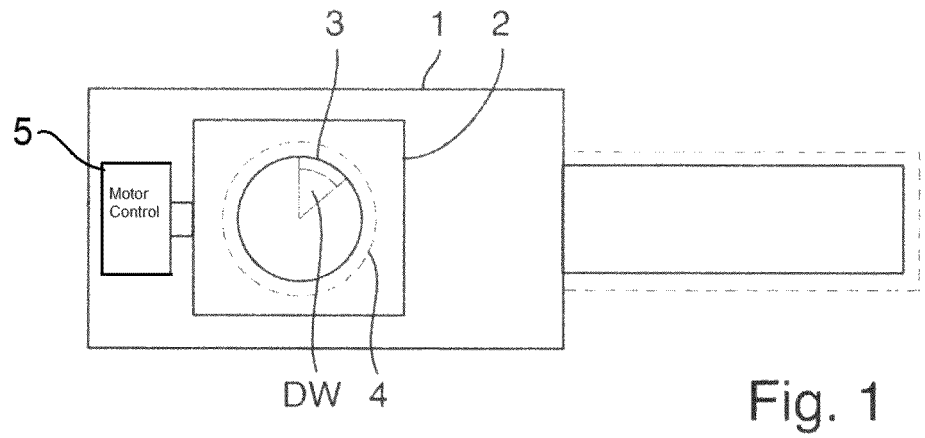
FIG. 1 is a highly schematic block circuit diagram of a hand-held tool in the form of a motorized chain saw.

FIG. 1 highly schematically shows a block circuit diagram of a hand-held tool 1 in the form of a motorized chain saw.

The hand-held tool 1 comprises a conventional brushless three-phase DC motor 2 having a rotor 3 and a three-phase stator 4. Reference should also be made in this respect to the relevant technical literature.

The hand-held tool 1 furthermore comprises a motor control apparatus 5 for driving the brushless DC motor 2, where the motor control apparatus 5 is designed to generate drive voltages suitable for the three phases of the stator 4. Suitable voltage and current sensors, which are not illustrated in any more detail, are also present, these sensors being provided to measure voltages and currents in the three phases of the stator 4, where the measured voltages and currents are suitably evaluated by the motor control apparatus 5.

The motor control apparatus 5 is provided to ascertain, without an encoder, a rotational angle position DW of the rotor 3 of the brushless DC motor 2, which is described in more detail below with reference to FIG. 2.

Figure 2:
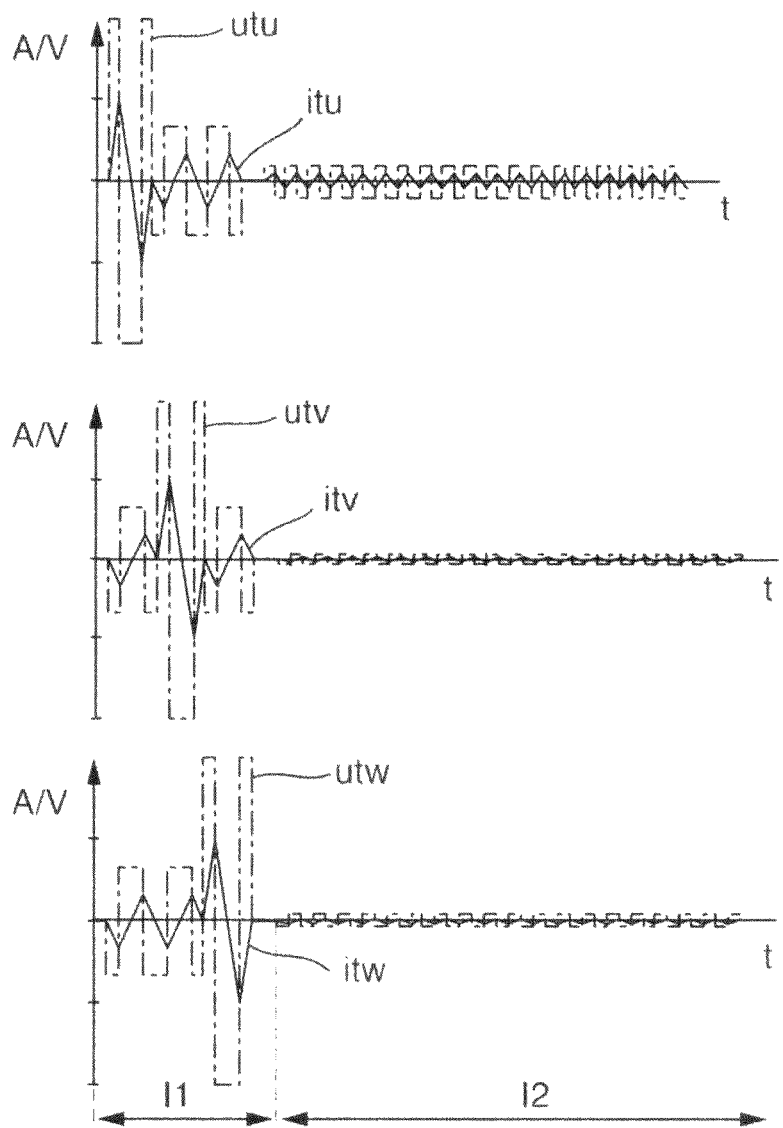
FIG. 2 shows an exemplary time profile of signals for ascertaining, without an encoder, a rotational angle position of a rotor of a brushless DC motor of the hand-held tool shown in FIG. 1.

FIG. 2 shows an exemplary time profile of test signals in the form of infed test voltages utu, utv, utw for respective phases u, v and w of the stator 4 and resulting response signals in the form of phase or response currents itu, itv, itw.

In a time interval I1, the motor control apparatus 5 uses suitable sensors to detect a voltage induced in the stator 4 of the brushless DC motor or voltages induced in stator windings of the stator 4. The motor control apparatus 5 then checks whether the detected voltage or voltages is or are lower than a threshold value. If the induced voltage or voltages is or are lower than the threshold value, which is the case by way of example at present, the motor control apparatus 5 ascertains an initial rotational angle position DW of the rotor 3 based on an Indirect Flux detection by Online Reactance Measurement (INFORM) that is known per se.

In time interval I2, which follows time interval I1, the motor control apparatus 5 updates the rotational angle position DW proceeding from the calculated initial rotational angle position DW using three continuous test signals in the form of test voltages utu, utv, utw that are fed into the stator windings. To this end, response signals or response currents itu, itv, itw that arise depending on the test signals or test voltages utu, utv, utw, are measured and the motor control apparatus 5 calculates the rotational angle position DW of the rotor 3 depending on the test signals or test voltages utu, utv, utw and the measured response signals or response currents itu, itv, itw.

The rotational angle position DW of the rotor 3 is usually detected in the rotational speed range of the brushless DC motor 2 above a threshold rotational speed, depending on the (counter-) voltage induced in the stator 4. The second rotational speed range adjoins time interval I2 in FIG. 2 and is not illustrated in any more detail.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for ascertaining, without an encoder, a rotational angle position of a rotor of a brushless DC motor, the method comprising the steps of:
    detecting a voltage induced in a stator of the brushless DC motor;
    checking whether the voltage induced in the stator is lower than a threshold value; and
    when the induced voltage is lower than the threshold value:
    ascertaining an initial rotational angle position of the rotor based on an Indirect Flux detection by Online Reactance Measurement, and
    subsequently updating the rotational angle position proceeding from the ascertained initial rotational angle position using at least one continuous test signal, wherein
    the subsequent updating of the rotational angle position proceeding from the ascertained initial rotational angle position using the at least one continuous test signal comprises the following steps:
    feeding continuous test signals into the stator of the brushless DC motor;
    ascertaining response signals that result depending on the continuous test signals; and
    determining the rotational angle position of the rotor depending on the continuous test signals and the response signals.

2. The method according to claim 1, wherein
    when the induced voltage is equal to the threshold value or is greater than the threshold value, carrying out the step of:
    calculating the rotational angle position of the rotor depending on the voltage induced in the stator.

3. A method for ascertaining, without an encoder, a rotational angle position of a rotor of a brushless DC motor, the method comprising the steps of:
    detecting a voltage induced in a stator of the brushless DC motor;
    checking whether the voltage induced in the stator is lower than a threshold value; and
    when the induced voltage is lower than the threshold value:
    ascertaining an initial rotational angle position of the rotor based on an Indirect Flux detection by Online Reactance Measurement, and
    subsequently updating the rotational angle position proceeding from the ascertained initial rotational angle position using at least one continuous test signal, wherein
    the ascertaining of the rotational angle position of the rotor based on the Indirect Flux detection by Online Reactance Measurement and the subsequent updating of the rotational angle position proceeding from the ascertained initial rotational angle position using the at least one continuous test signal are carried out up to a threshold rotational speed, wherein the threshold rotational speed is in a range between 18% and 22% of a rated rotational speed of the brushless DC motor.

4. A hand-held tool, comprising:
    a brushless DC motor; and
    a motor control apparatus for driving the brushless DC motor, wherein the motor control apparatus is operatively configured to:
    detect a voltage induced in a stator of the brushless DC motor;
    check whether the voltage induced in the stator is lower than a threshold value; and when the induced voltage is lower than the threshold value:
ascertain an initial rotational angle position of the rotor based on an Indirect Flux detection by Online Reactance Measurement, and
subsequently update the rotational angle position proceeding from the ascertained initial rotational angle position using at least one continuous test signal by:
feeding continuous test signals into the stator of the brushless DC motor;
ascertaining response signals that result depending on the continuous test signals; and
determining the rotational angle position of the rotor depending on the continuous test signals and the response signals.

5. A hand-held tool, comprising:
a brushless DC motor; and
a motor control apparatus for driving the brushless DC motor, wherein the motor control apparatus is operatively configured to:
detect a voltage induced in a stator of the brushless DC motor;
check whether the voltage induced in the stator is lower than a threshold value; and
when the induced voltage is lower than the threshold value:
ascertain an initial rotational angle position of the rotor based on an Indirect Flux detection by Online Reactance Measurement, and
subsequently update the rotational angle position proceeding from the ascertained initial rotational angle position using at least one continuous test signal, wherein
the ascertaining of the rotational angle position of the rotor based on the Indirect Flux detection by Online Reactance Measurement and the subsequent updating of the rotational angle position proceeding from the ascertained initial rotational angle position using the at least one continuous test signal are carried out up to a threshold rotational speed, wherein the threshold rotational speed is in a range between 18% and 22% of a rated rotational speed of the brushless DC motor.

\* \* \* \* \*